US008243621B2

(12) United States Patent
Tamura et al.

(10) Patent No.: US 8,243,621 B2
(45) Date of Patent: Aug. 14, 2012

(54) METHOD, APPARATUS, AND PROGRAM FOR CONFIGURING NETWORKS WITH CONSISTENT ROUTE AND BANDWIDTH SETTINGS

(75) Inventors: Naohiro Tamura, Kawasaki (JP); Junichi Sakuma, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1063 days.

(21) Appl. No.: 11/482,473

(22) Filed: Jul. 7, 2006

(65) Prior Publication Data
US 2007/0189152 A1     Aug. 16, 2007

(30) Foreign Application Priority Data

Feb. 13, 2006  (JP) ................................. 2006-035527

(51) Int. Cl.
    *H04L 12/28*     (2006.01)
(52) U.S. Cl. ........ 370/254; 370/229; 370/231; 370/235; 370/241; 370/252; 370/255; 370/386; 370/389; 370/395.21; 370/395.41; 709/220; 709/238; 709/240; 709/245
(58) Field of Classification Search .................. None
    See application file for complete search history.

(56) References Cited

U.S. PATENT DOCUMENTS

| | | | | |
|---|---|---|---|---|
| 5,948,108 A | * | 9/1999 | Lu et al. .......................... | 714/4.1 |
| 2003/0031124 A1 | * | 2/2003 | Chow et al. .................... | 370/216 |
| 2004/0057412 A1 | * | 3/2004 | Curcio et al. .................. | 370/341 |
| 2006/0067243 A1 | * | 3/2006 | Bejerano et al. .............. | 370/252 |

FOREIGN PATENT DOCUMENTS

JP          10-051488          2/1998

* cited by examiner

*Primary Examiner* — Faruk Hamza
*Assistant Examiner* — Aixa A Guadalupe Cruz
(74) *Attorney, Agent, or Firm* — Greer, Burns & Crain, Ltd.

(57) ABSTRACT

An apparatus and method for verifying route and bandwidth settings of multiple services provided over networks. The apparatus has an extractor and a verifier. Based on input data describing services each having primary and secondary routes between specific locations, an available bandwidth of each network, and a guaranteed bandwidth of each service, the extractor selects a first network to be verified and extracts first services that use the first network as their respective primary routes. The extractor then selects at least one second network from among the networks that the first services specify as their respective secondary routes. The extractor extracts second services that use the second network as their primary routes and specify the first network as their secondary routes. The verifier sums up guaranteed bandwidths that the first and second services should provide, and determines whether the sum is smaller than an available bandwidth of the first network.

11 Claims, 15 Drawing Sheets

| EDGE DEVICE NAME | MANAGED IP | OS | Password | Enable Password |
|---|---|---|---|---|
| EDGE-Center-1A | AA.BB.CC.DD | EDGE OS12.2 | ******** | ******** |
| EDGE-Center-1B | ...... | ...... | ...... | ...... |
| EDGE-M1-1A | | | | |
| EDGE-M1-1B | | | | |
| EDGE-M2-1A | | | | |
| EDGE-M2-1B | | | | |

| SERVICE NAME | TYPE | REACH-ABILITY | START LOCATION | BANDWIDTH CONSISTENCY 1 | EXCHANGE POINT | BANDWIDTH CONSISTENCY 2 | END LOCATION |
|---|---|---|---|---|---|---|---|
| ACCOUNTING SYSTEM 1 | MAIN | GOOD | SALES BRANCH#1 | GOOD | EXCHANGE POINT#1 | GOOD | DATA CENTER |
| | MAIN | GOOD | DATA CENTER | SECONDARY ROUTE MIN | EXCHANGE POINT#1 | SECONDARY ROUTE MAX | SALES BRANCH#1 |
| | SUB | GOOD | SALES BRANCH#1 | PRIMARY ROUTE MIN | EXCHANGE POINT#2 | PRIMARY ROUTE MAX | DATA CENTER |
| | SUB | NOT GOOD | DATA CENTER | GOOD | EXCHANGE POINT#2 | GOOD | SALES BRANCH#1 |

FIG. 13

| GUI REPRESENTATION | MODEL 1 | MODEL 2 | MODEL 3 | MODEL 4 |
|---|---|---|---|---|
| Start Location-WAN-End Location (Service Route) | wan-outbound | (none) | policy route | (none) |
| Type (Primary/Secondary) (Primary Route/Secondary Route) | primary-link backup-link | (none) | policy route | (none) |
| Maximum Bandwidth Limit | bandwidth <max-band> | rate-limit | policy apply rate <excess_limit_bps> partition <maxBps> | (none) |
| Minimum Guaranteed Bandwidth | bandwidth <min-band> | bandwidth | policy apply rate <gur_lo_bps> <guar_hi_bps> partition <minBps> | lan ip priority |
| Priority (Priority Control) | bandwidth high-priority | priority | policy apply priority | lan ip priority |
| Equalization (Equalization Control) | partition | fair-queue | (none) | lan ip priority |
| Source IP, Destination IP, Protocol, Port (Service Classification) | match | match access group | Class | acl ip, acl tcp, acl udp |

METHOD, APPARATUS, AND PROGRAM FOR CONFIGURING NETWORKS WITH CONSISTENT ROUTE AND BANDWIDTH SETTINGS

CROSS-REFERENCE TO RELATED APPLICATIONS

This application is based upon, and claims the benefits of priority from, the prior Japanese Patent Application No. 2006-035527, filed Feb. 13, 2006, the entire contents of which are incorporated herein by reference.

BACKGROUND OF THE INVENTION

1. Field of the Invention

The present invention relates to a method, apparatus, and computer program for configuring networks. More particularly, the present invention relates to a network configuration method, apparatus, and program stored in a computer-readable medium for configuring networks to maintain the quality of services executed between an access source location and an access destination location.

2. Description of the Related Art

Many businesses have used reliable, bandwidth-guaranteed network services to interconnect their business locations over wide area networks (WAN) based on public switched telephone networks (PSTN), public data communications networks, or leased lines. The communications technologies used in this type of WANs include the Point-to-Point Protocol (PPP), High Level Data Link Control (HDLC), Integrated Services Digital Network (ISDN), Frame Relay, and Asynchronous Transfer Mode (ATM). The recent trend, however, is toward virtual private networks using Internet Protocol (IP-VPN) or wide area Ethernet™ services. While IP-based services generally offer no guarantee of bandwidth and are relatively less reliable, the enterprise network users can enjoy a greatly increased bandwidth of, for example, more than 1 Gbps, in contrast to some 100 Mbps of conventional networks.

Also, recent years have seen a widespread use of IP phones based on the Voice over IP (VoIP) technologies, as well as a proliferation of video conference systems using streaming techniques. Network systems tend to carry those new service traffic in addition to business applications. IP phones and video conference systems are more sensitive to network delays than other ordinary data communication services. A delay due to an excessive burst of traffic would degrade the quality of a delivered sound or video stream.

Some legacy applications (i.e., non-web-based applications) providing mission-critical services 24 hours, 365 days a year are designed on the assumption that they can use network connections with a guaranteed bandwidth. Those applications cannot migrate to a new web-based environment unless the network system offers guaranteed bandwidth services. To meet such demands, IP-based wide-area networks are required to provide bandwidth-guaranteed, secure and reliable communication channels equivalent to conventional leased line connections.

Under the above-described circumstances, more and more functions are integrated into a network device (e.g., router and switch) deployed at business locations and at the edge of a WAN. For example, recent network devices have the functions of controlling bandwidth, priority, security, and routing with multihoming support. Those features are also available as dedicated appliances that can work seamlessly in combination with a router or a switch.

To realize a highly reliable IP-based WAN by using such edge devices, some verification mechanism has to be implemented to quickly check the configuration of many edge devices distributed across the network. This may typically be realized by using Telnet login and command line interface (CLI) of each edge device (e.g., routers, switches, traffic controller, security controllers) located at offices or on WAN edges. It is, however, not easy to check the order and consistency of device settings, while keeping in mind the difference between vender-specific CLI specifications, as well as considering the overall network topology. This difficulty leads to an increased cost of network system operations.

One known method to reduce the workload of operations and management is to distribute a configuration file from an operation management site to each edge device on the network. This method, however, merely automates the task of applying the settings that are previously prepared. One drawback of the method is its dependency on the interface specifications of each individual device and the consequent lack of versatility. Another drawback is that the method does nothing about guaranteeing bandwidth for multiple services. Yet another drawback is that the operator needs to know well about quality of service (QoS) control mechanisms.

To address the problems described above, Japanese Patent No. 3137583 proposes a static setting method for routing parameters of network devices. However, the proposed method still lacks consideration of bandwidth guarantee for multiple services.

SUMMARY OF THE INVENTION

In view of the foregoing, it is an object of the present invention to provide a method, an apparatus, and a program stored in a computer-readable medium for verifying whether the routes and bandwidths of service traffic are configured correctly.

To accomplish the above object, the present invention provides a method of configuring networks to maintain quality of services executed between an access source location and an access destination location. This network configuration method comprises the following steps: (a) receiving input data describing a plurality of services each having a primary route and a secondary route between the access source location and the access destination location, an available bandwidth of each network carrying traffic of the services, and a guaranteed bandwidth of each of the services; (b) selecting, from among the plurality of networks, a first network to be verified, based on the received input data; (c) extracting first services that use the first network as primary routes thereof; (d) selecting at least one second network from among the networks that the first services specify as secondary routes thereof; (e) extracting second services that use the second network as primary routes thereof and specify the first network as secondary routes thereof; (f) calculating a sum of the guaranteed bandwidths that are supposed to be available to the first services and the second services; and (g) determining whether the sum is smaller than an available bandwidth of the first network.

Also, to accomplish the above object, the present invention provides an apparatus for configuring networks to maintain quality of services executed between an access source location and an access destination location. This apparatus has an extractor and a verifier. The extractor receives input data describing a plurality of services each having a primary route and a secondary route between the access source location and the access destination location, an available bandwidth of each network carrying traffic of the services, and a guaranteed bandwidth of each of the services. Based on this received input data, the extractor selects a first network to be verified, from among the plurality of networks. The extractor extracts first services that use the selected first network as their primary routes. The extractor selects at least one second network from among the networks that the first services specify as their secondary routes. The extractor then extracts second services that use the second network as primary routes and specify the first network as secondary routes. The verifier calculates a sum of guaranteed bandwidths that are supposed to be available to the first services and the second services, and determines whether the sum is smaller than an available bandwidth of the first network.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 6 shows an edge device data table.
FIG. 12 shows a window that contains a table representing a result of consistency verification.
FIG. 13 gives a command reference table showing how the setting commands for edge devices vary depending on their vendors.

DESCRIPTION OF THE PREFERRED EMBODIMENTS

Figure 1:
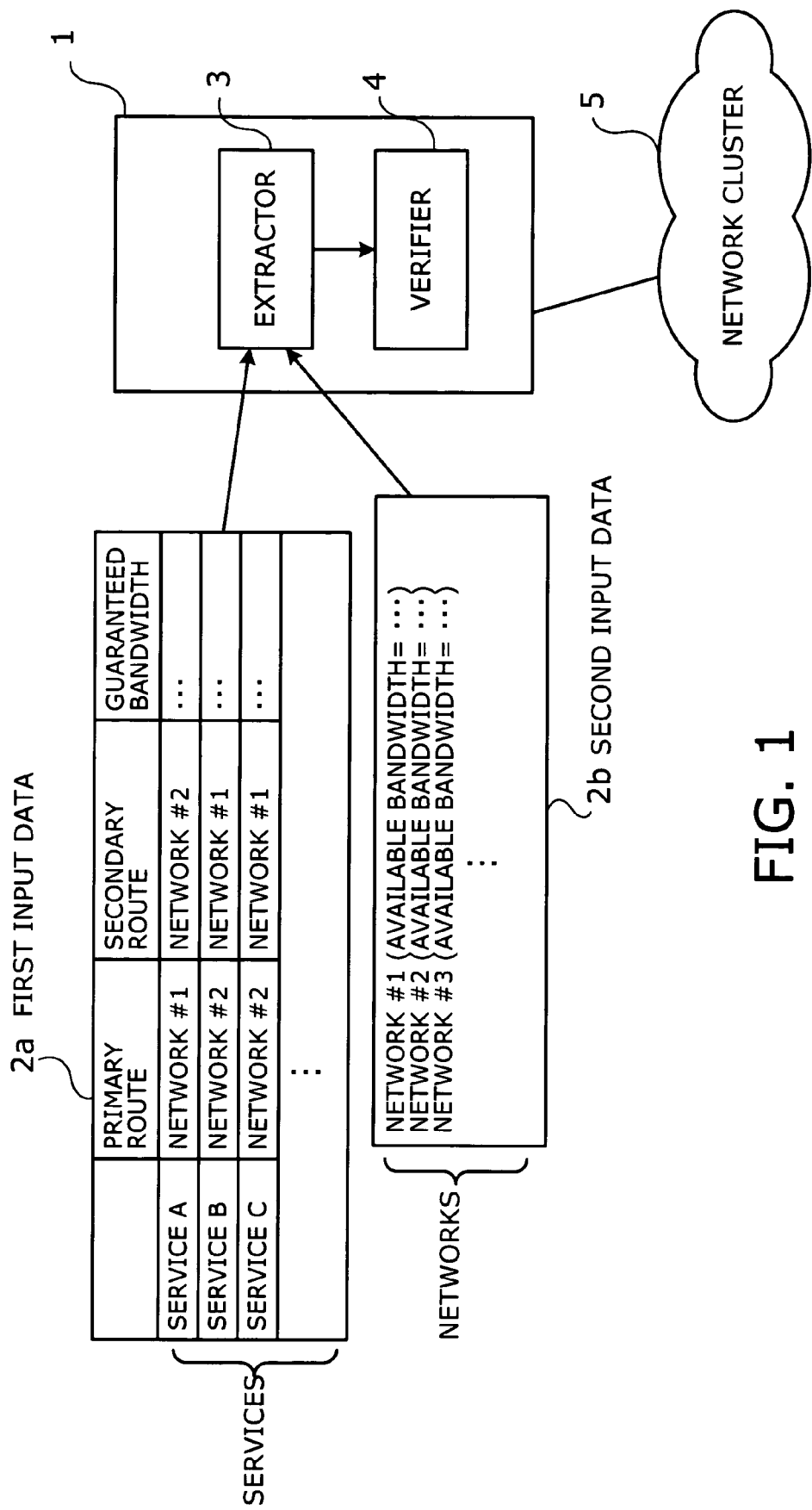
FIG. 1 is a conceptual view of an embodiment of the present invention.

Preferred embodiments of the present invention will now be described in detail below with reference to the accompanying drawings, wherein like reference numerals refer to like elements throughout. The following description begins with an overview of the present invention and then proceeds to a more specific embodiment of the invention.

FIG. 1 is a conceptual view of the present invention. The illustrated network configuration device 1 is used primarily to manage the route and bandwidth of each application service in a wide-area network environment employing multi-vendor edge devices to carry data traffic across two or more different business locations. Each service has a primary route and at least one secondary route interconnecting two locations. According to the present embodiment, the network configuration device 1 has an extractor 3 and a verifier 4 and linked to a network cluster 5 to which the managed networks belong.

The extractor 3 receives two sets of input data, first input data 2a and second input data 2b. The first input data 2a describes primary and secondary routes of each service, as well as a guaranteed bandwidth that is supposed to be available to each service. The second input data 2b gives an available bandwidth of each intermediate network, i.e., how much bandwidth each network can offer to carry the service traffic.

Based on the given first input data 2a and/or second input data 2b, the extractor 3 selects a specific network as an object to be verified in the subsequent process. The selected network is referred to herein as a first network. The extractor 3 then consults the first input data 2a to extract first services that use the selected first network as their primary routes. The extractor 3 further identifies a second network that the extracted first services specify as their secondary routes. The extractor 3 also extracts second services that use the identified second network as their primary route.

The verifier 4 calculates a sum of guaranteed bandwidths of the second services, which use the second network as their primary routes and specify the first network as their secondary routes. The verifier 4 further adds the guaranteed bandwidth of the first service to that sum. The verifier 4 then verifies whether the resulting sum of guaranteed bandwidths is smaller than the available bandwidth of the first network. The information about available bandwidth of each network can be obtained by using Simple Network Management Protocol (SNMP) or the like.

In the example of FIG. 1, Services A, B, C, and so on are executed across different business locations (not shown). Each service has a predefined primary route and secondary route interconnecting locations as shown in the first input data 2a. More specifically, Service A uses Network #1 as its primary route and specifies Network #2 as its secondary route, while Services B and C use Network #2 as their primary routes and Network #1 as their secondary routes. Available bandwidths of Networks #1 to #3 are given in the second input data 2b.

The network configuration device 1 operates in the context of FIG. 1 as follows. The extractor 3 first focuses on a specific entry of the second input data 2b, thus selecting Network #1 as a target network to be verified. The extractor 3 then extracts a service that uses the selected Network #1 under verification as its primary route. What is selected in this case is Service A. The extractor 3 then seeks a network that the extracted service A specifies as its secondary route, thus finding Network #2. The extractor 3 then identifies which services are using Network #2 as their primary routes. The first input data 2a indicates that they are Service B and Service C.

Consulting the second input data 2b, the verifier 4 calculates a sum of guaranteed bandwidths of Services B and C, which use Network #2 as their primary routes and Network #1 as their secondary routes. The verifier 4 further adds the guaranteed bandwidth of Service A, thus obtaining the sum of guaranteed bandwidths of all services A, B, and C relevant to Network #1, the network under verification. The verifier 4 now verifies whether the obtained sum is smaller than the available bandwidth of Network #1 under verification.

The network configuration device 1 verifies the consistency of a plurality of service routes and their bandwidth allocations in the above-described way. The network operators use this device when, for example, their network system needs to be modified. The proposed network configuration device 1 helps them configure the network routes and bandwidth allocations correctly, thus making their systems more reliable. More specific embodiments of the present invention will now be described in the following sections.

Network System

Figure 2:
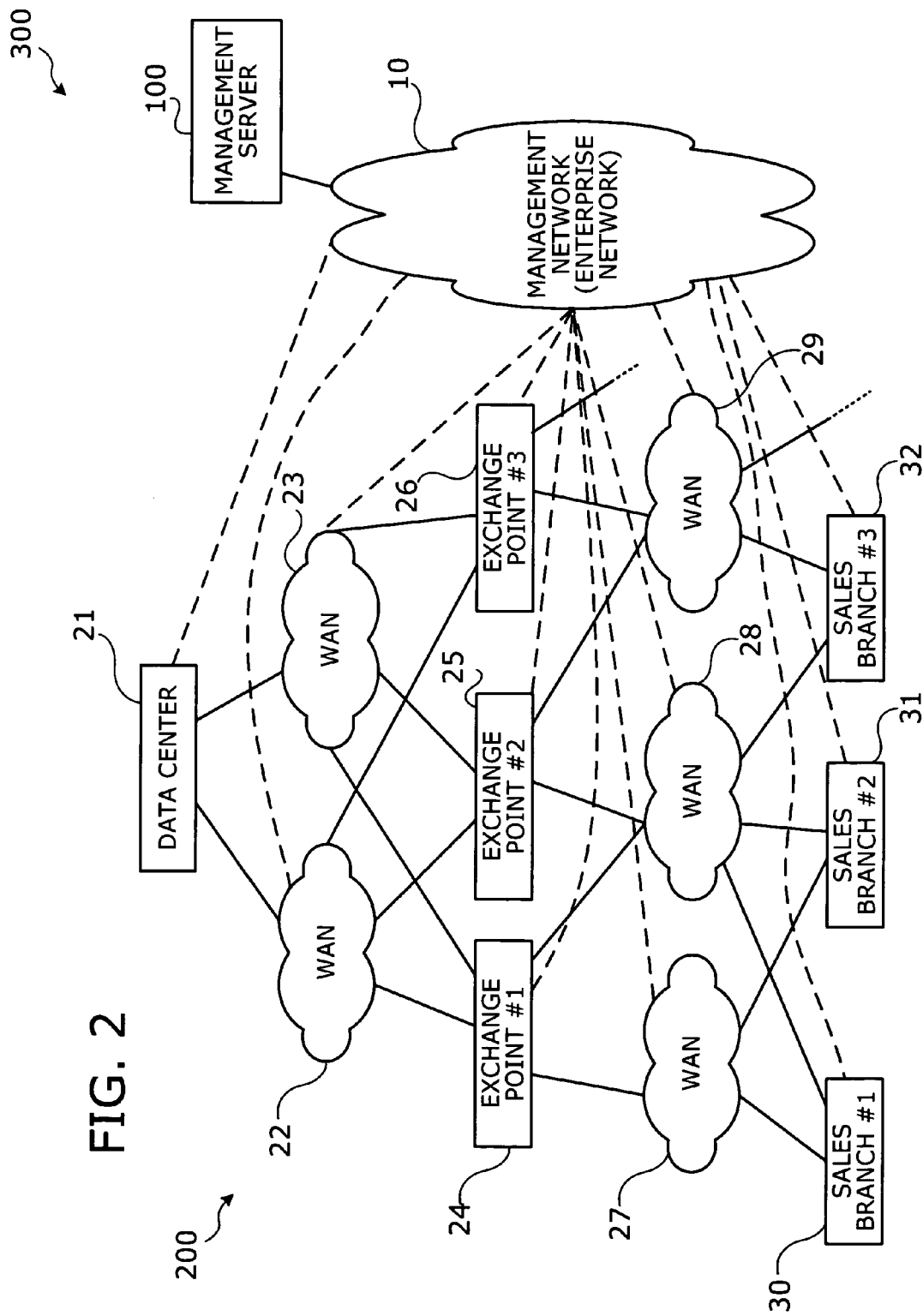
FIG. 2 shows the configuration of a network system according to an embodiment of the present invention.

FIG. 2 shows the configuration of a network system according to an embodiment of the present invention. The illustrated network system 300 serves as part of a public infrastructure or a mission-critical system that supports a company's business operations such as manufacturing control. Specifically, the network system 300 involves a management server 100 and its managed object group 200. Various applications, including accounting services, run on the network system 300.

The management server 100 functions as a network provisioning system that allocates bandwidth quotas and other resources for services to be provided. The management server 100 is linked to a managed object group 200 through an enterprise's management network 10, which may also be referred to as an enterprise network. The managed object group 200 includes a data center 21, WANs 22 and 23, exchange points 24 to 26, WANs 27 to 29, and sales branches 30 to 32.

The data center 21 offers Internet access service, as well as operations and maintenance service, upon demand from exchange points 24 to 26. The data center 21 acts as, for example, a web server by running web server applications.

The WANs 22 and 23 are relatively large networks operated by, for example, a nationwide service provider. The WANs 22 and 23 carry communication data traffic between the data center 21 and exchange points 24 to 26. The exchange points 24 to 26 are intermediate facilities that collect communications data from sales branches 30 to 32 and forward them to the data center 21, or vice versa.

The WANs 27 to 29 are, on the other hand, relatively small networks operated by, for example, regional network service providers. The WANs 27 to 29 carry communication data traffic between the sales branches 30 to 32 and exchange points 24 to 26.

The sales branches 30 to 32 are part of an enterprise's sales network over the country. Service applications run between those sales branches 30 to 32 and the data center 21, as well as among the sales branches 30 to 32. The present embodiment assumes that an accounting service is provided between the sales branch 30 and data center 21. Edge devices are deployed at the data center 21, WANs 22 and 23, exchange points 24 to 26, WANs 27 to 29, and sales branches 30 to 32. Edge devices offer dual-redundant functions for routing, switching, packet controlling, and others.

Hardware Configuration of Management Server

Figure 3:
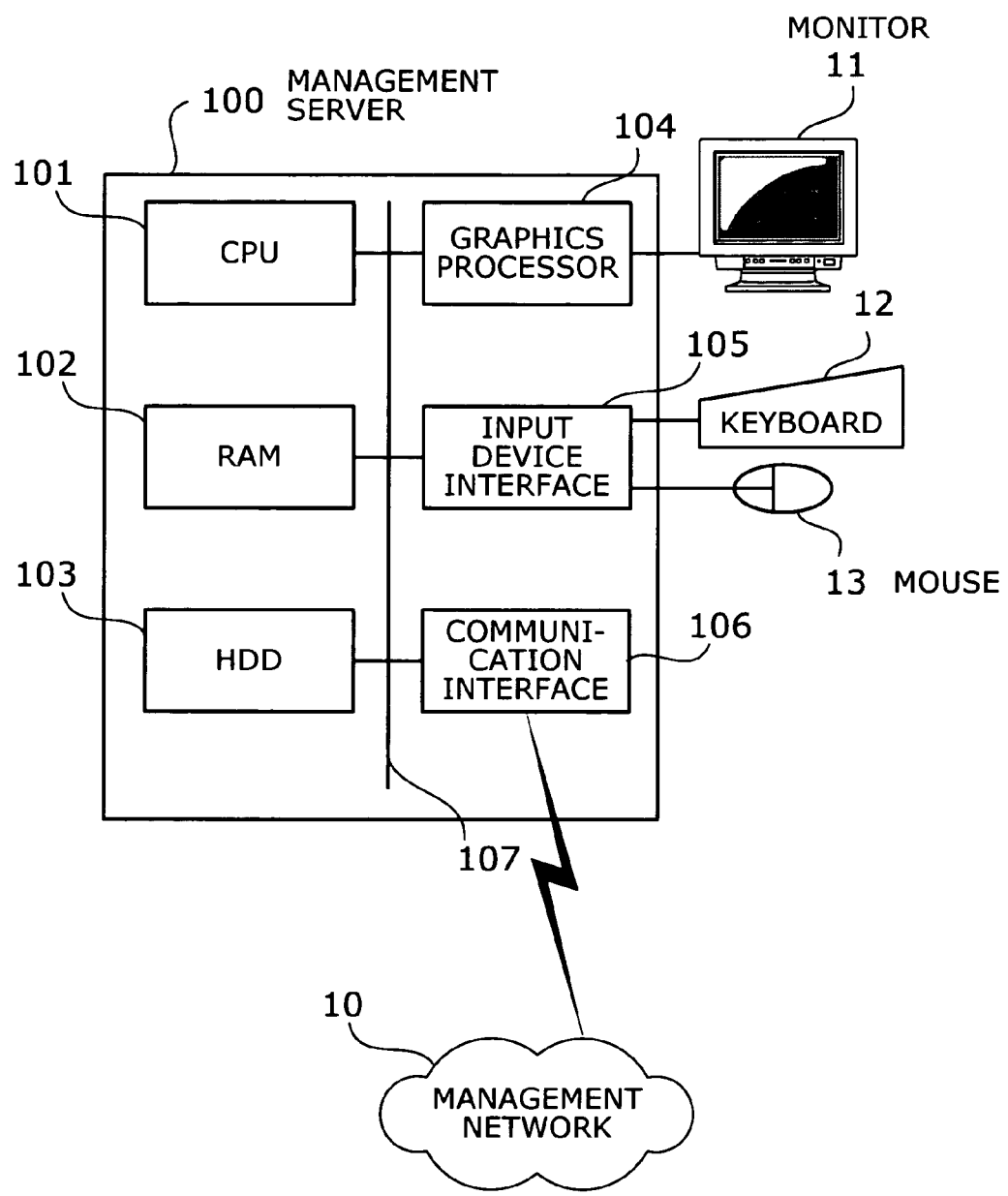
FIG. 3 shows an example hardware configuration of a management server.

FIG. 3 shows an example hardware configuration of the management server 100. The illustrated management server 100 has the following functional elements: a central processing unit (CPU) 101, a random access memory (RAM) 102, a hard disk drive (HDD) 103, a graphics processor 104, an input device interface 105, and a communication interface 106. The CPU 101 controls the entire system of the management server 100, interacting with other elements via a bus 107.

The RAM 102 serves as temporary storage for the whole or part of operating system (OS) programs and application programs that the CPU 101 executes, in addition to other various data objects manipulated at runtime. The HDD 103 stores program and data files of the operating system and various applications.

The graphics processor 104 produces video images in accordance with drawing commands from the CPU 101 and displays them on the screen of an external monitor 11 coupled thereto. The input device interface 105 is used to receive signals from external input devices, such as a keyboard 12 and a mouse 13. Those input signals are supplied to the CPU 101 via the bus 107. The communication interface 106 is connected to the management network 10, allowing the CPU 101 to exchange data with other computers (not shown) on that network 10. The computer system described above serves as a hardware platform for realizing the processing functions of the present embodiment.

Management Server Functions

Figure 4:
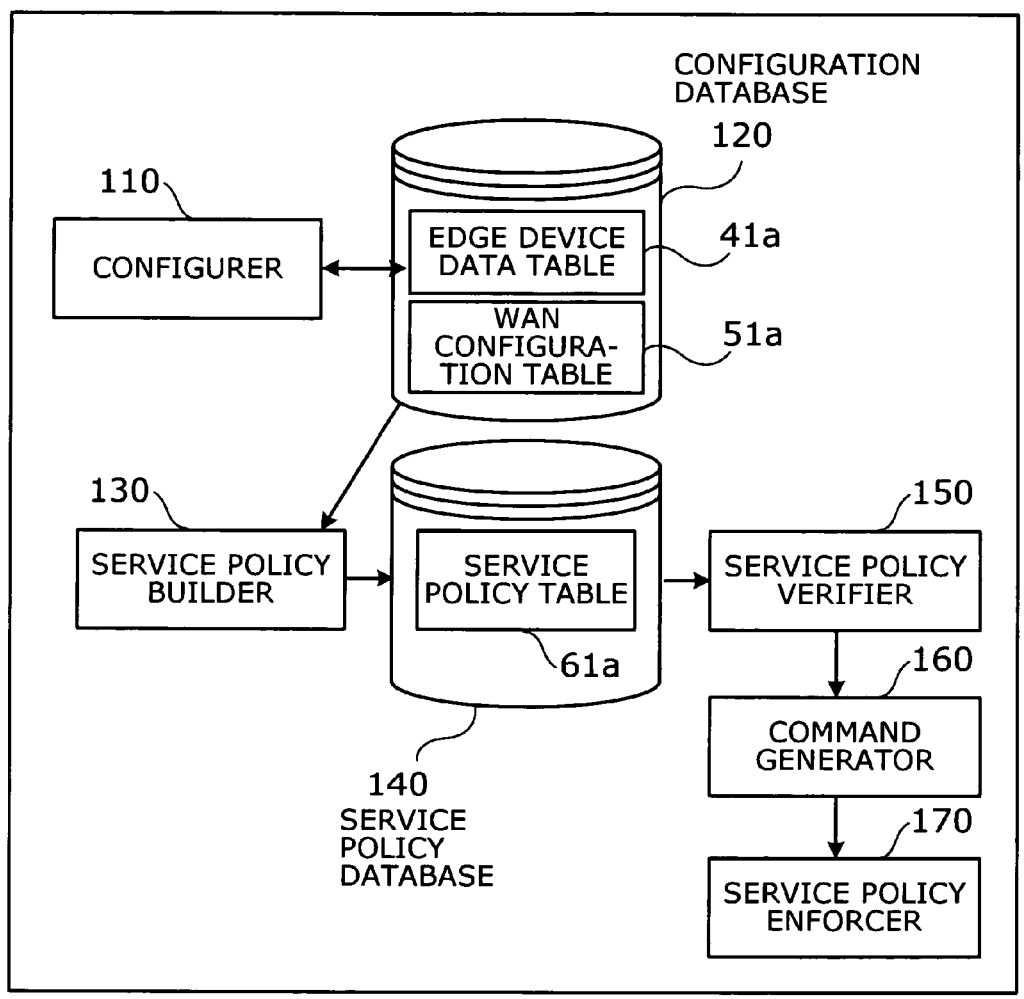
FIG. 4 is a block diagram showing the functions of the management server.

With the hardware configuration described in the preceding section, the management server 100 employs various functional elements for network provisioning purposes. FIG. 4 is a block diagram of the management server 100. As seen, the management server 100 has a configurer 110, a configuration database 120, a service policy builder 130, a service policy database 140, a service policy verifier 150, a command generator 160, and a service policy enforcer 170.

The configurer 110 is responsive to automatic node detection of a network management product, such as Systemwalker™ Centric Manager and Systemwalker™ Network Manager, or to instructions from a management server administrator. When requested, the configurer 110 creates and edits an edge device data table 41a in a configuration database 120. The edge device data table 41a contains information about edge devices in the WANs 22, 23, 27 to 29, exchange points 24 to 26, and sales branches 30 to 32.

The configurer 110 provides a GUI-based WAN configuration window for the operator to build an edge device data table 41a by using a keyboard 12 and mouse 13. According to user input, the configurer 110 builds a WAN configuration table 51a in the configuration database 120 to describe properties of each edge device interconnecting WANs 22, 23, and 27 to 29 and sales branches. Using this WAN configuration table 51a in the configuration database 120, the service policy builder 130 creates a service policy table 61a in the service policy database 140 to describe how to operate and manage the services. Specifically, the service policy table 61a contains route parameters and bandwidth parameters for operating an accounting service. Route parameters define primary and secondary routes, each including a forward route and a return route, that carry the accounting service traffic. Bandwidth parameters define how much bandwidth each primary or secondary route is supposed to guarantee.

The service policy builder 130 interacts with the operator through a GUI-based service policy setting window, allowing him/her to build a service policy table 61a by using the keyboard 12 and mouse 13.

Figure 5:
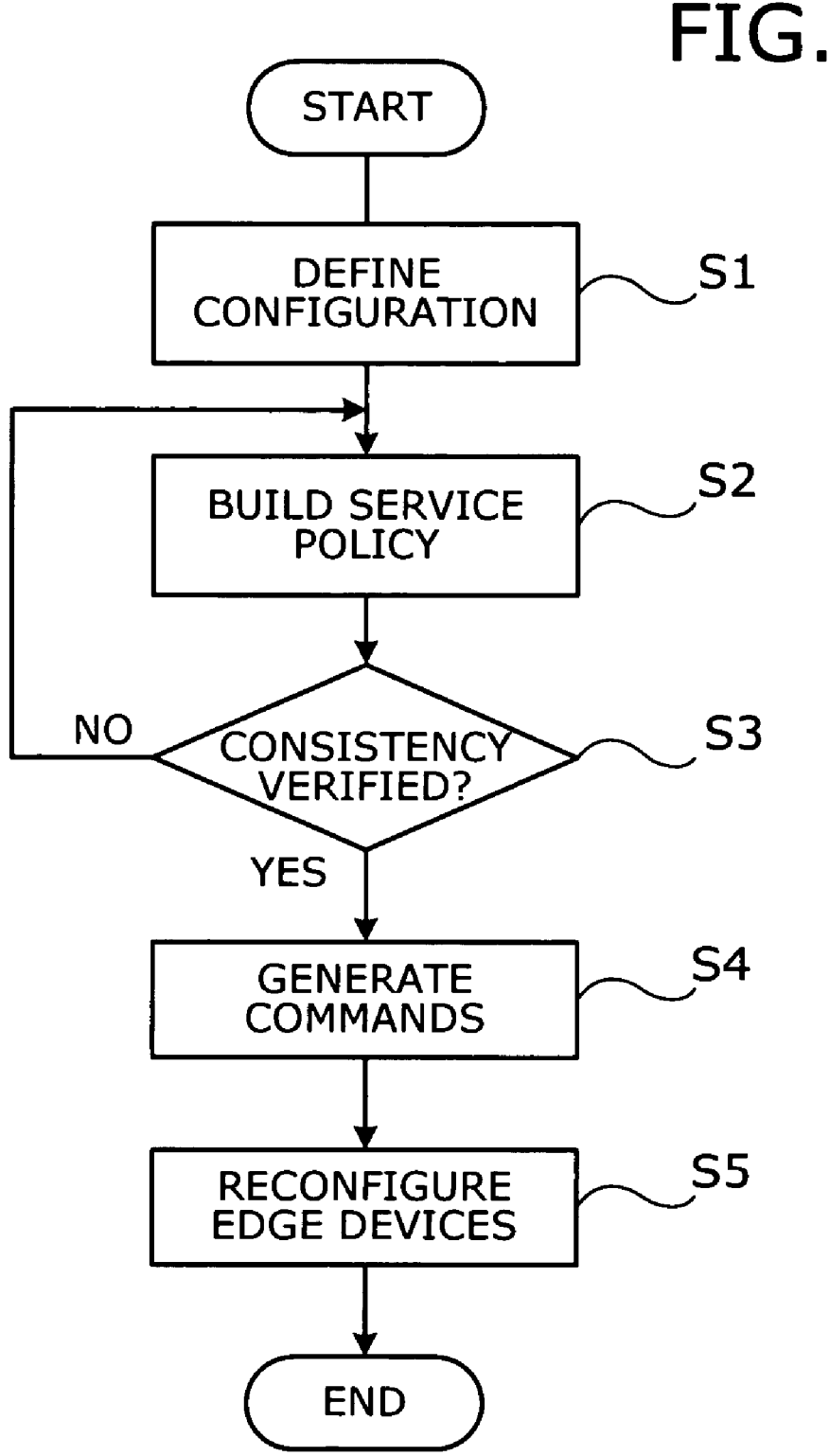
FIG. 5 is a flowchart showing how the management server provides administrative services.

It is assumed in the present embodiment that the primary forward route of accounting service traffic goes from the sales branch 30 to the data center 21, passing through the WAN 27, exchange point 24, and WAN 22 in that order. It is also assumed that the primary return route of the accounting service traffic goes from the data center 21 to the sales branch 30, passing through the WAN 22, exchange point 24, and WAN 27 in that order. It is further assumed that the secondary forward route of accounting service traffic goes from the sales branch 30 to the data center 21, passing through the WAN 28, exchange point 25, and WAN 23 in that order. Yet another assumption is that the secondary return route of accounting service traffic goes from the data center 21 to the sales branch 30, passing through the WAN 23, exchange point 25, and WAN 28 in that order. The present embodiment also assumes the use of an edge device data table 41a, WAN configuration table 51a, and service policy table 61a shown in FIGS. 5, 6, and 7, respectively. These tables will be described in detail later.

The service policy verifier 150 verifies consistency of the entire network system by making sure that there are no contradictions in the service policy parameters defined in the service policy table 61a. The details of this consistency verification will be described in a later section.

The command generator 160 generates commands for reconfiguring edge devices according to their respective properties by consulting the service policy data after it is verified by the service policy verifier 150. The service policy enforcer 170 sends those commands to their destination devices to enforce the policy.

Suppose, for example, that a new network configuration has to be added to the network system 300 of FIG. 2. The management server 100 then performs an administrative session according to the flowchart of FIG. 5. First, the configurer 110 defines the entire system configuration by creating an edge device data table 41a and a WAN configuration table 51a (step S1). Then the service policy builder 130 builds a service policy in a service policy table 61a by consulting the edge device data table 41a and WAN configuration table 51a stored in the configuration database 120 (step S2). The service policy verifier 150 verifies consistency of this service policy table 61a stored in the service policy database 140 (step S3). If the service policy table 61a contains some inconsistency (i.e., if "NO" at step S3), the service policy verifier 150 returns to step S2 to allow the operator to modify the service policy table 61a. If the service policy table 61a is found consistent (i.e., if "YES" at step S3), then the command generator 160 produces vendor-specific commands to implement the content of the service policy table 61a on each edge device (step S4). Finally the service policy enforcer 170 enforces the device reconfiguration as a transaction of each service (step S5), thus completing the administrative session. The subsequent sections will describe each step S1 to S5 in detail.

Edge Device Data Table

FIG. 6 shows the edge device data table 41a. The illustrated edge device data table 41a has the following data fields: "Edge Device Name," "Managed IP," "OS," "Password," and "Enable Password. Each row of this edge device data table 41a forms an associated set of parameters describing the profile of a particular edge device.

More specifically, the edge device name field shows the name of a specific edge device deployed in the network system 300. The example of FIG. 6 gives the following edge device names: "EDGE-Center-1A," "EDGE-Center-1B," "EDGE-M1-1A," "EDGE-M1-1B," "EDGE-M2-1A," and "EDGE-M2-1B." The managed IP field shows the IP address of a corresponding edge device, which is used for administrative purposes. The example of FIG. 6 gives a managed IP address "AA.BB.CC.DD" for the corresponding device "EDGE-Center-1A."

The OS field indicates the operating system used in the corresponding edge device. The example of FIG. 6 gives the name of a specific OS "EDGE OS12.2" running on the device "EDGE-Center-1A." The password field contains a special password required for management of the corresponding edge device. The example of FIG. 6 gives a password "*******" of the device "EDGE-Center-1A." The enable password field contains an enable password with no particular restrictions. The example of FIG. 6 gives a password "*******" of the device "EDGE-Center-1A."

The above data fields are filled out for every edge device belonging to the network system 300. In the present embodiment, the edge device data table 41a has edge device entries corresponding to the data center 21, exchange points 24 to 26, and sales branches 30 to 32.

WAN Configuration Table

Figure 7:
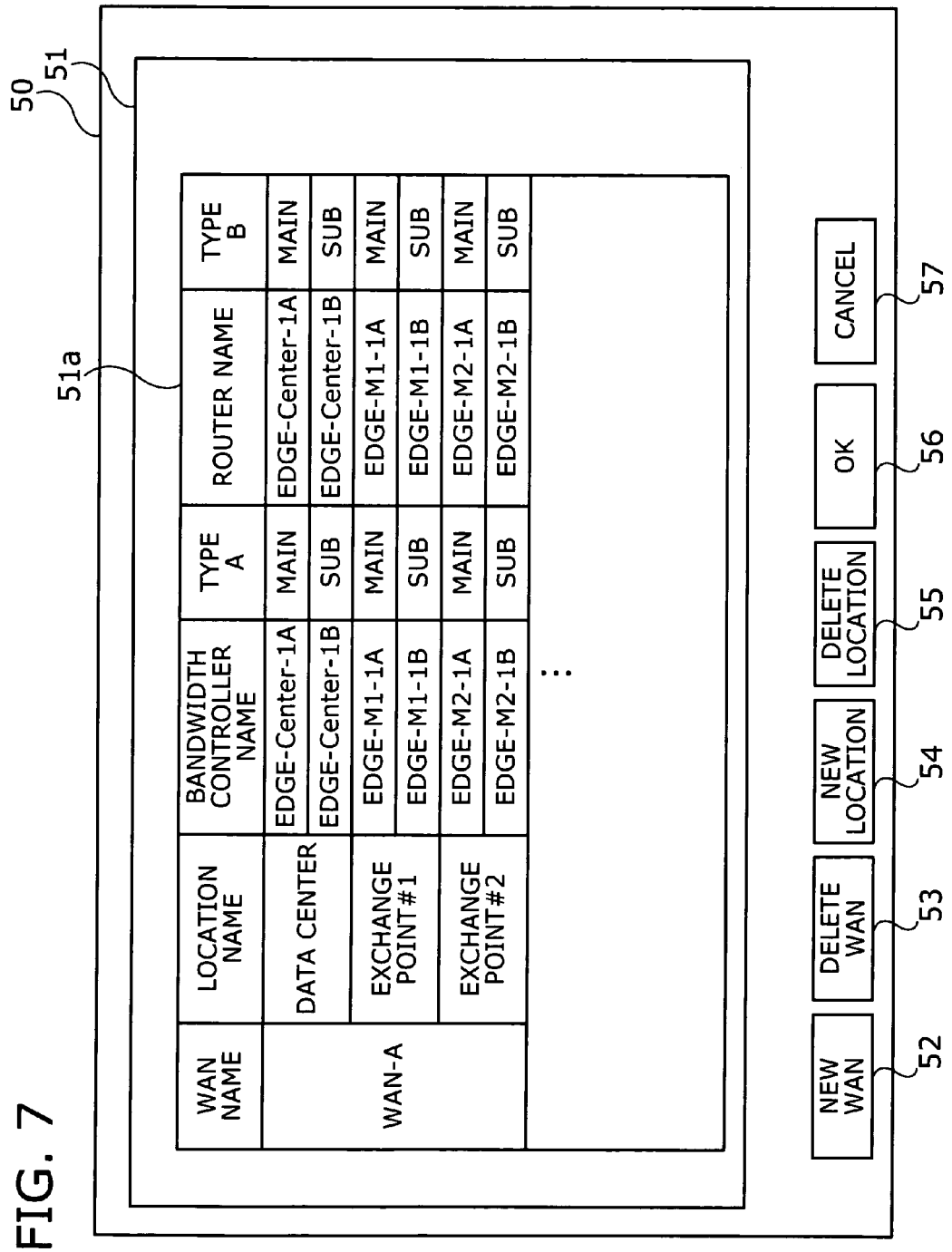
FIG. 7 shows a WAN configuration window.

FIG. 7 shows a WAN configuration window 50. This WAN configuration window 50 provides a table field 51, ADD WAN button 52, DELETE WAN button 53, ADD LOCATION button 54, DELETE LOCATION button 55, OK button 56, and CANCEL button 57. The table field 51 contains a WAN configuration table 51a, which has the following data fields, from left to right: "WAN Name," "Location Name," "Bandwidth Controller Name," "Type A," "Router Name," and "Type B. Each row of this WAN configuration table 51a forms an associated set of parameters describing a particular WAN.

The WAN Name field indicates the name of a WAN. In the example of FIG. 7, the name "WAN-A" represents the WAN 22 shown in FIG. 2. Adding a WAN name to the WAN configuration table 51a enables the operator to define locations. The location name field accommodates symbols of locations connected to the WAN 22. Specifically, the WAN configuration table 51a of FIG. 7 has the following location name field entries: "Data Center" representing the data center 21, "Exchange Point #1" representing an exchange point 24, and "Exchange Point #2" representing another exchange point 25.

The WAN configuration table 51a allows the operator to define four edge devices for each location, which include a bandwidth controller and a router used in the primary route, as well as those used in the secondary route. The bandwidth controller name field specifies an edge device for controlling bandwidth at a location. The WAN configuration table 51a may provide a pull-down menu for selection of a bandwidth controller name and a router name, the menu containing the names of candidate edge devices previously registered in the edge device data table 41a.

The type A field next to each bandwidth controller name is set to either "MAIN" or "SUB" indicating that the corresponding bandwidth controller is a working edge device or a protection edge device. In the case where the bandwidth controller is protected with a dual-redundant design, both "MAIN" and "SUB" devices are defined. Otherwise, the operator only fills out a "MAIN" edge device field while leaving the corresponding "SUB" field blank. In the example of FIG. 7, two bandwidth controllers "EDGE-Center-1A" and "EDGE-Center-1B" are registered respectively as "MAIN" and "SUB" bandwidth controllers located at the data center 21. Also registered are a "MAIN" bandwidth controller named "EDGE-M1-1A" and a "SUB" bandwidth controller named "EDGE-M1-1B," both located at the exchange point 24. Further registered are a "MAIN" bandwidth controller named "EDGE-M2-1A" and a "SUB" bandwidth controller named "EDGE-M2-1B," both located at the exchange point 25.

The router name field specifies an edge device for routing network traffic, and the corresponding type B field takes a value of "MAIN" or "SUB" to indicate whether that edge device serves as a working device or a protection device in the case where the routing function is protected with a dual-redundant design. In the example of FIG. 7, the bandwidth controller name field and router name field contain the same names since the present embodiment assumes that both the bandwidth controller function and router function are integrated in a single edge device. The present invention, however, should not be limited to this assumption since it is of course possible to use separate edge devices for bandwidth control and routing.

The operator defines the above parameters for all WANs 22, 23, and 27 to 29, although FIG. 7 only shows those of WAN 22. A new WAN entry can be added to the WAN configuration table 51a by pressing the NEW WAN button 52. The operator is then allowed to enter a new WAN name to a newly opened WAN name field. The operator subsequently presses a NEW LOCATION button 54, which permits him/her to define locations connected to the WAN.

The operator may delete an existing entry of the WAN configuration table 51a. To delete a specific WAN entry, he/she selects it and presses a DELETE WAN button 53. This action deletes all service parameters associated with the selected WAN, including the values of location name field, bandwidth controller name field, type A field, router name field, and type B field. To delete a particular location registered in the WAN configuration table 51a, he/she selects it and presses a DELETE LOCATION button 55. This action removes the selected location from the existing WAN entry.

The WAN configuration window 50 further provides an OK button 56 to make the edited WAN configuration table 51a take effect. Pressing the OK button 56 finalizes the WAN configuration table 51a, thus causing its contents to be transferred to the configuration database 120.

The operator can cancel the current editing session of the WAN configuration table 51a by pressing a CANCEL button 57. Pressing this CANCEL button 57 allows the operator to exit from the editing session without reflecting the changes that he/she have made to the WAN configuration table 51a.

Service Policy Table

Figure 8:
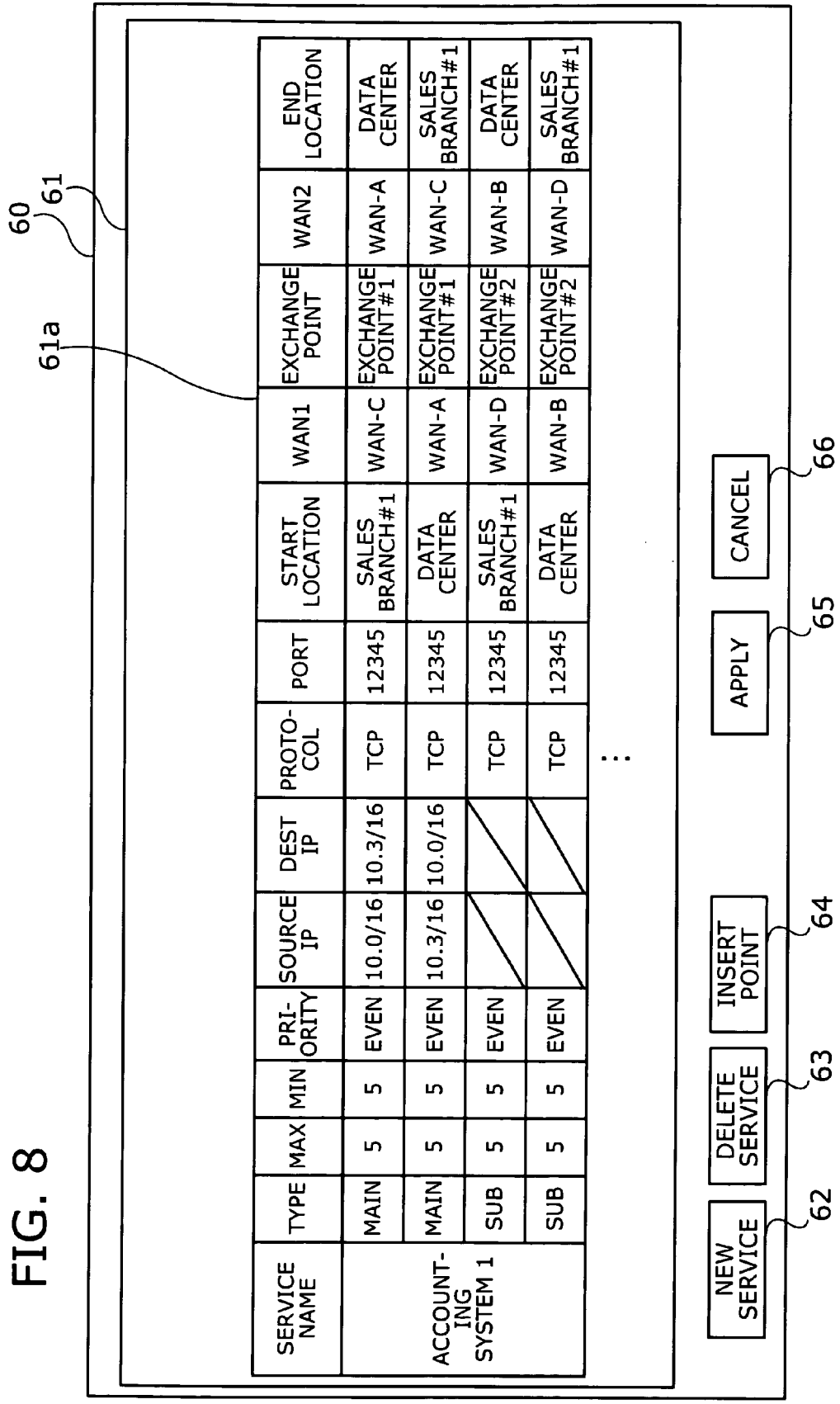
FIG. 8 shows a service policy setting window.

FIG. 8 shows a service policy setting window 60 for building a service policy. This service policy setting window 60 has the following objects: a table field 61, a NEW SERVICE button 62, a DELETE SERVICE button 63, an INSERT POINT button 64, a SEND button 65, and a CANCEL button 66.

The table field 61 contains a service policy table 61a, which has the following data fields, from left to right: "Service Name," "Type," "Max," "Min," "Priority," "Source IP," "Dest IP," "Protocol," "Port," "Start Location," "WAN1," "Exchange Point," "WAN2," and "End Location." Each row of this service policy table 61a forms an associated set of parameters describing a policy of a specific service.

Each entry of the service policy table 61a takes up four lines. The first line defines a primary forward route, the second line a primary return route, the third line a secondary forward route, and the fourth line a secondary return route.

The service name field shows the name of a specific service. Specifically, the example of FIG. 8 gives a value of "Accounting System 1" in this field, which is the name of the accounting service that the present embodiment assumes. The type field and subsequent data fields describe a primary forward route, a primary return route, a secondary forward route, and a secondary return route on which the service traffic of "Accounting System 1" will be conveyed. Primary routes are indicated by the type field value of "MAIN" while secondary routes are indicated by the type field value of "SUB."

The max field defines a maximum bandwidth limit in units of Mbps (megabits per second). This parameter places a predetermined limit to the traffic of the corresponding service, so as to prevent that service from consuming too much network capacity and consequently interfering with other service traffic. In the example of FIG. 8, every route is limited to 5 Mbps.

The min field defines a minimum guaranteed bandwidth in units of Mbps for the corresponding service. This parameter gives the amount of bandwidth that the service traffic can occupy, no matter how much traffic other services may produce. FIG. 8 shows that every route provides a capacity of at least 5 Mbps.

The operator specifies both or either of those max and min parameters as necessary. He/she may leave them blank in the case no specific guarantee or limitation is required. When he/she specifies both, the max parameter has to be greater than the min parameter.

The priority field provides a drop-down list for the operator to select a value of either "Priority" or "Even" (the latter being default). When "Priority" is selected, the service is assigned to a priority queue that a corresponding edge device supports, so that it will be processed in preference to other services in a normal queue. Streaming services such as VoIP applications may be given a "Priority" property since a traffic delay would be fatal to the quality of those services. Note that the operator is only allowed to prioritize one route per service. An attempt to set two or more priority routes for the same service would cause an error. In the example of FIG. 8, the priority field is set to "even" for all entries.

The source IP field indicates the IP address of a service source of the accounting service in the present context. The IP address may be either a host IP address or a subnet IP address. According to the example of FIG. 8, a source IP address value of "10.0/16" is set to the primary forward route, and "10.3/16" to the primary return route, where lower 16 bits are omitted because they are subnet IP addresses. The secondary route entries are automatically filled out with the same IP address values as their corresponding primary route entries.

The destination IP (DEST IP) field contains the IP address of a service destination of the accounting service in the present context. The IP address may be either a host IP address or a subnet IP address. According to the example of FIG. 8, an IP address value of "10.3/16" is set to the primary forward route, and "10.0/16" to the primary return route, where lower 16 bits are omitted because they are subnet IP addresses. The secondary route entries are automatically filled out with the same IP address values as their corresponding primary route entries.

The protocol field specifies a protocol, which is, in the present embodiment, selected from among those listed in a drop-down list. The list may include the following protocols: Transmission Control Protocol (TCP), User Datagram Protocol (UDP), Internet Control Message Protocol (ICMP), File Transfer Protocol (FTP), H.323, Real-Time Streaming Protocol/Real-time Transport Protocol (RTSP/RTP), and Session Initiation Protocol/Session Description Protocol/RTP (SIP/SDP/RTP). TCP is selected for every table entry in the example of FIG. 8.

The port field depends on the protocol field. Specifically, when the corresponding protocol field has a value of "FTP," "H.323," "RTSP/RTP," or "SIP/SDP/RTP," the port field is set to "dynamic." In the case of "ICMP," the port field becomes unavailable. In the case of "TCP" or "UDP," the port field accommodates a specific port number. In FIG. 8, every protocol field is set to "TCP," and thus the corresponding port field contains a value of "12345" as an example port number.

The start location field indicates where the corresponding route starts. In the example of FIG. 8, the start location fields of the primary and secondary forward routes are set to "Sales Branch #1" representing the sales branch 30, and those of the primary and secondary return routes are set to "Data Center."

The exchange point field specifies an exchange point, i.e., an intermediate location between the start location and the end location. According to FIG. 8, the exchange point field contains an exchange point name "Exchange Point #1" representing the exchange point 24 on the primary forward and return routes, as well as "Exchange Point #2" representing the exchange point 25 on the secondary forward and return routes.

The end location field indicates where the corresponding route reaches. In the example of FIG. 8, the end location fields of the primary and secondary forward routes are set to "Data Center" representing the data center 21, and those of the primary and secondary return routes are both set to "Sales Branch #1" representing the sales branch 30.

Note that every primary route and its corresponding secondary route should be routed in such a way that they will pass through different WANs. In other words, the primary and secondary routes must not meet each other before reaching their common destination. This avoids the possibility of the two routes failing simultaneously.

The WAN1 field indicates a WAN that interconnects the start location and exchange point. According to FIG. 8, the WAN1 field of the primary forward route contains a value of "WAN-C," the name of WAN 27 interconnecting the sales branch 30 and exchange point 24. Also the WAN1 field of the primary return route contains a value of "WAN-A," the name of WAN 22 interconnecting the data center 21 and exchange point 24. Further, the WAN1 field of the secondary forward route contains a value of "WAN-D," the name of WAN 28 interconnecting the sales branch 30 and exchange point 24. Also the WAN1 field of the secondary return route contains a value of "WAN-B," the name of WAN 23 interconnecting the data center 21 and exchange point 24.

The WAN2 field indicates a WAN that interconnects the corresponding exchange point and end location in a similar way to the WAN1 field. Referring to FIG. 8, the WAN2 field of the primary forward route contains a value of "WAN-A," the name of WAN 22 interconnecting the exchange point 24 and data center 21. Also the WAN2 field of the primary return route contains a value of "WAN-C," the name of WAN 27 interconnecting the exchange point 24 and sales branch 30. Further, the WAN2 field of the secondary forward route contains a value of "WAN-B," the name of WAN 23 interconnecting the exchange point 25 and data center 21. Also the WAN2 field of the secondary return route contains a value of "WAN-D," the name of WAN 28 interconnecting the exchange point 25 and sales branch 30.

The operator presses a NEW SERVICE button 62 when he/she needs to add a new service entry to the service policy table 61a. The operator is then allowed to enter the name of a new service to a newly opened service name field.

The service policy setting window 60 also offers a DELETE SERVICE button 63 for the operator to remove an existing service entry from the service policy table 61a. Pressing this DELETE SERVICE button 63 causes the selected service to be deleted from the service name field and other related data fields.

The operator can add a new exchange point entry to the service policy table 61a by pressing an INSERT POINT button 64. The INSERT POINT button 64, when pressed, adds a new exchange point field between the start location and end location, together with a corresponding WAN field.

The parameters set in the service policy table 61a do not take effect until an APPLY button 65 is pressed. This APPLY button 65 causes the edited service policy table 61a to be saved into the service policy database 140.

The operator can cancel the current editing session of the service policy table 61a by pressing a CANCEL button 66. Pressing this CANCEL button 66 allows the operator to exit from the editing session without reflecting any changes that he/she have made to the service policy table 61a.

Figure 9:
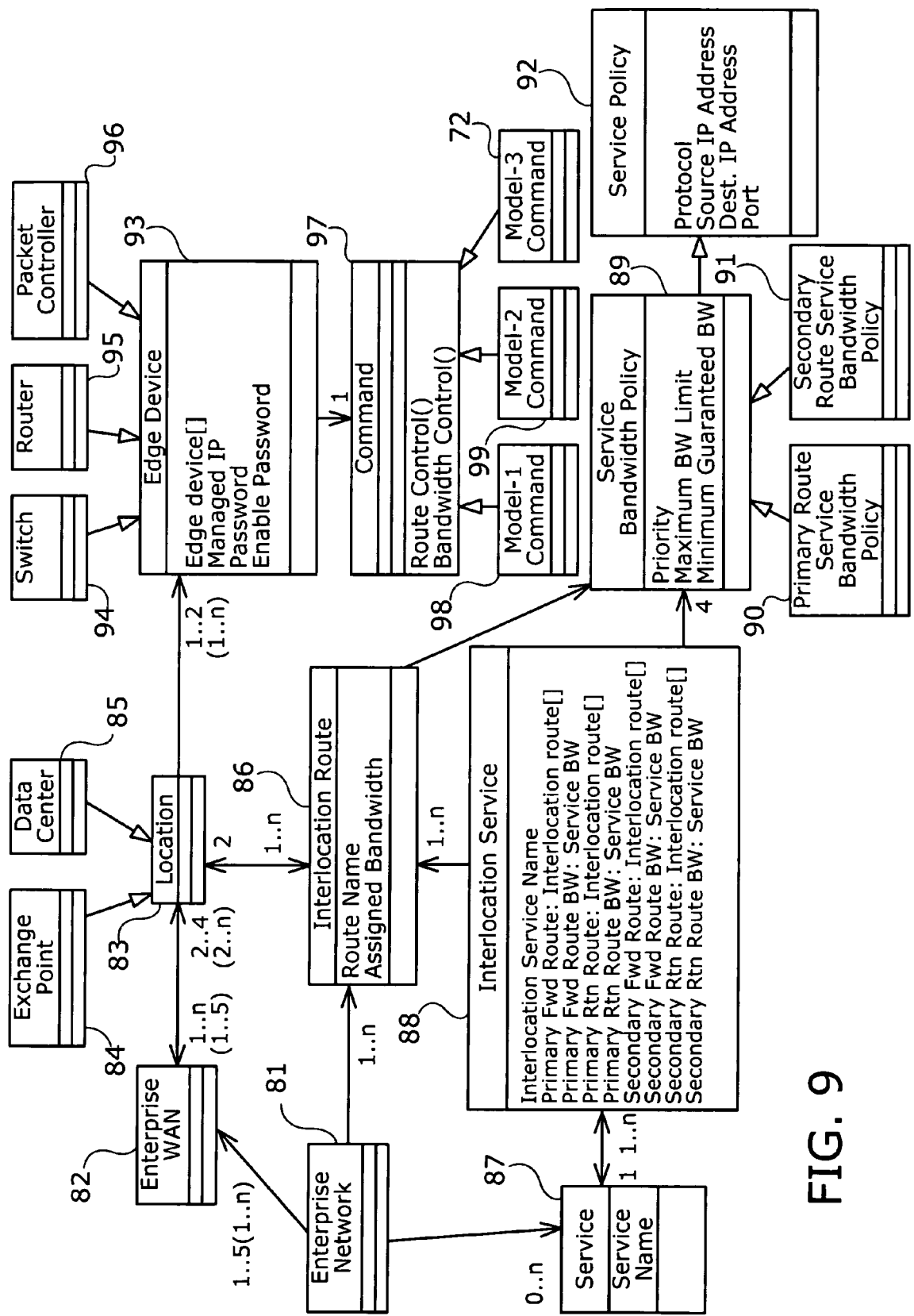
FIG. 9 is a class diagram showing an example data structure of a service policy database according to the present embodiment.

The operator repeatedly uses those buttons to add new services or remove obsolete services until the service policy table 61a contains as many entries as the number of actual services. A service policy database schema is designed and implemented, based on this service policy table 61a. FIG. 9 is a class diagram showing a service policy database schema according to the present embodiment.

Enterprise network class 81 has one instance per enterprise. One enterprise network class instance has references to a plurality of enterprise WANs. For enterprise WAN class 82, as many instances as the number of enterprise WANs are created. Specifically, the present embodiment involves five enterprise WAN class instances, WANs 22, 23, 27, 28, and 29.

Enterprise WAN class 82 has references to a plurality of instances of location class 83, which are created as many as the number of locations. Specifically, the present embodiment involves sales branches 30 to 32, exchange points 24 to 26, and a data center 21 as location class instances. Exchange point class 84 and data center class 85, corresponding to the exchange points 24 to 26 and data center 21, are created as subclasses inheriting properties from the location class 83.

Location class 83 has references to a plurality of instances of enterprise WAN class 82. For example, the sales branch 30 in the present embodiment has references to two WANs 27 and 28. Location class 83 also has references to a plurality of instances of interlocation route class 86. The term "interlocation route" refers to a route between locations connected to a single WAN. Think of, for example, four locations on a WAN edge. In this case there are twelve (=4×3) ways to connect two locations (when forward and return routes are counted as different routes). That is, twelve instances of the interlocation route class 86 are created.

Interlocation route class 86 has references to two instances of location class 83; one is a start location and the other is an end location.

Enterprise network class 81 has references to as many instances of service class 87 as the number of services. Specifically, one service class instance is created in the present embodiment.

Service class 87 has references to a plurality of instances of interlocation service class 88, meaning that one service can be represented as a set of interlocation services.

Interlocation service class 88 has the following four route properties: primary forward route, primary return route, secondary forward route, and secondary return route. Those properties are represented as an array of references to interlocation route class instances. Interlocation service class 88 also has the following four bandwidth properties: primary forward route bandwidth, primary return route bandwidth, secondary forward route bandwidth, and secondary return route bandwidth. Each of those properties is represented as a reference to an instance of service bandwidth policy class 89. It has to be noted here that a primary route service bandwidth policy class 90 representing a service bandwidth policy of a primary route is defined as an inheritance from service bandwidth policy class, as is a secondary route service bandwidth policy class 91 representing a service bandwidth policy of secondary routes.

Primary forward route bandwidth and primary return route bandwidth are references to instances of primary route service bandwidth policy class 90. Likewise, secondary forward route bandwidth and secondary return route bandwidth are references to instances of secondary route service bandwidth policy class 91.

Each instance of interlocation route class 86 gives a specific route and has a specific available bandwidth as its property. It also has references to a plurality of service bandwidth policy class instances. Those instances form a set of service bandwidth parameters for a plurality of services.

Service policy class 92 is defined as a superclass of service bandwidth policy class 89, with the properties of "Protocol," "Source IP Address," "Destination IP Address," and "Port."

Edge device class 93 has the properties of "edge device," "Managed IP," "Password" and "Enable Password," each represented as a reference to command class 97. Switch class 94, router class 95, and packet control equipment class 96 are subclasses inheriting properties from the edge device class 93. Edge device class 93 has references to command class 97.

Command class 97 provides commands for controlling routes and bandwidths, the subclasses of which include: model-1 command class 98, model-2 command class 99, and model-3 command class 72. Those subclasses represent vendor-specific commands used in the individual edge devices.

Consistency Verification

Figure 10:
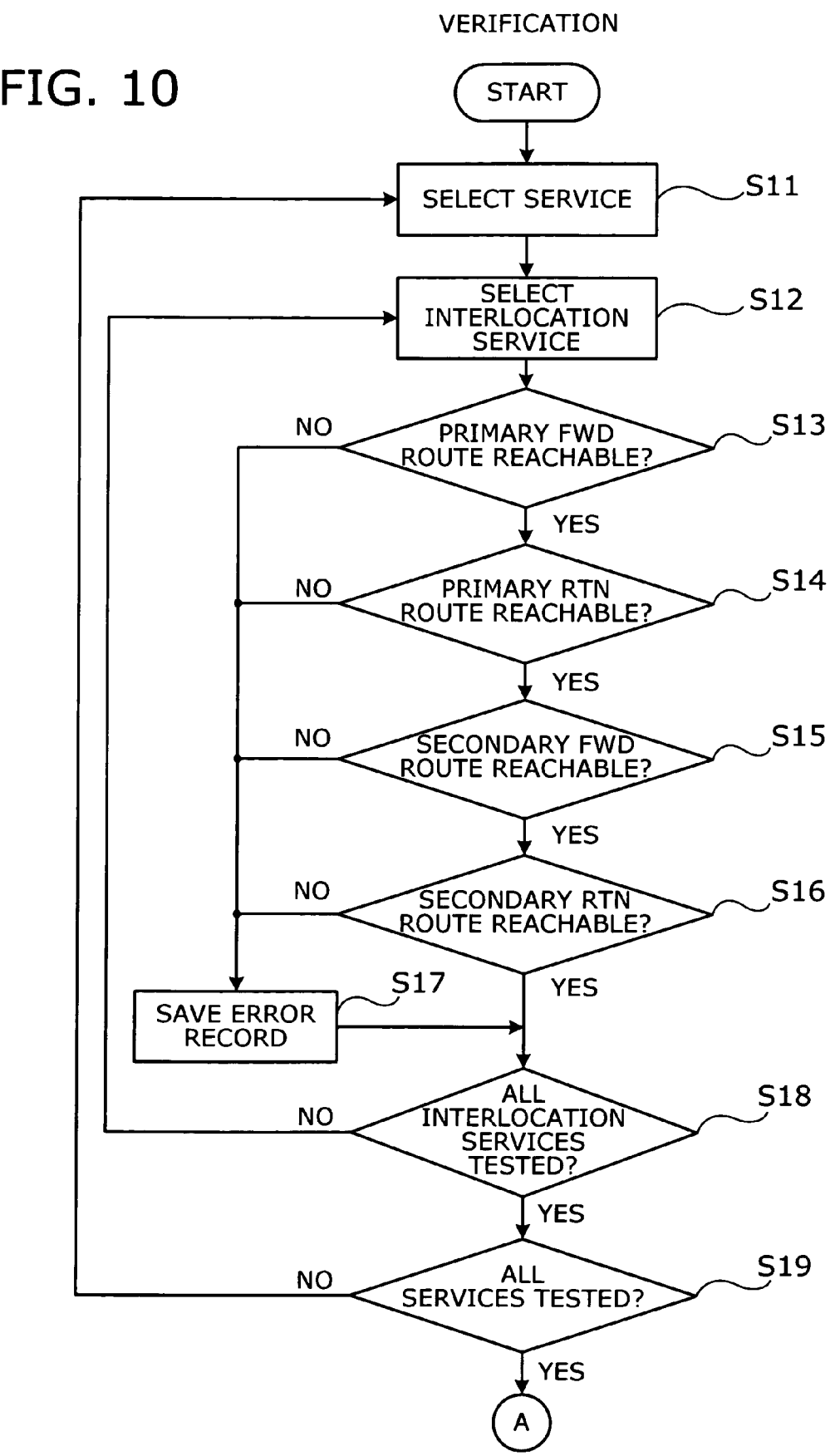
FIGS. 10 and 11 show a flowchart of a process that verifies consistency of service policies.
Figure 11:
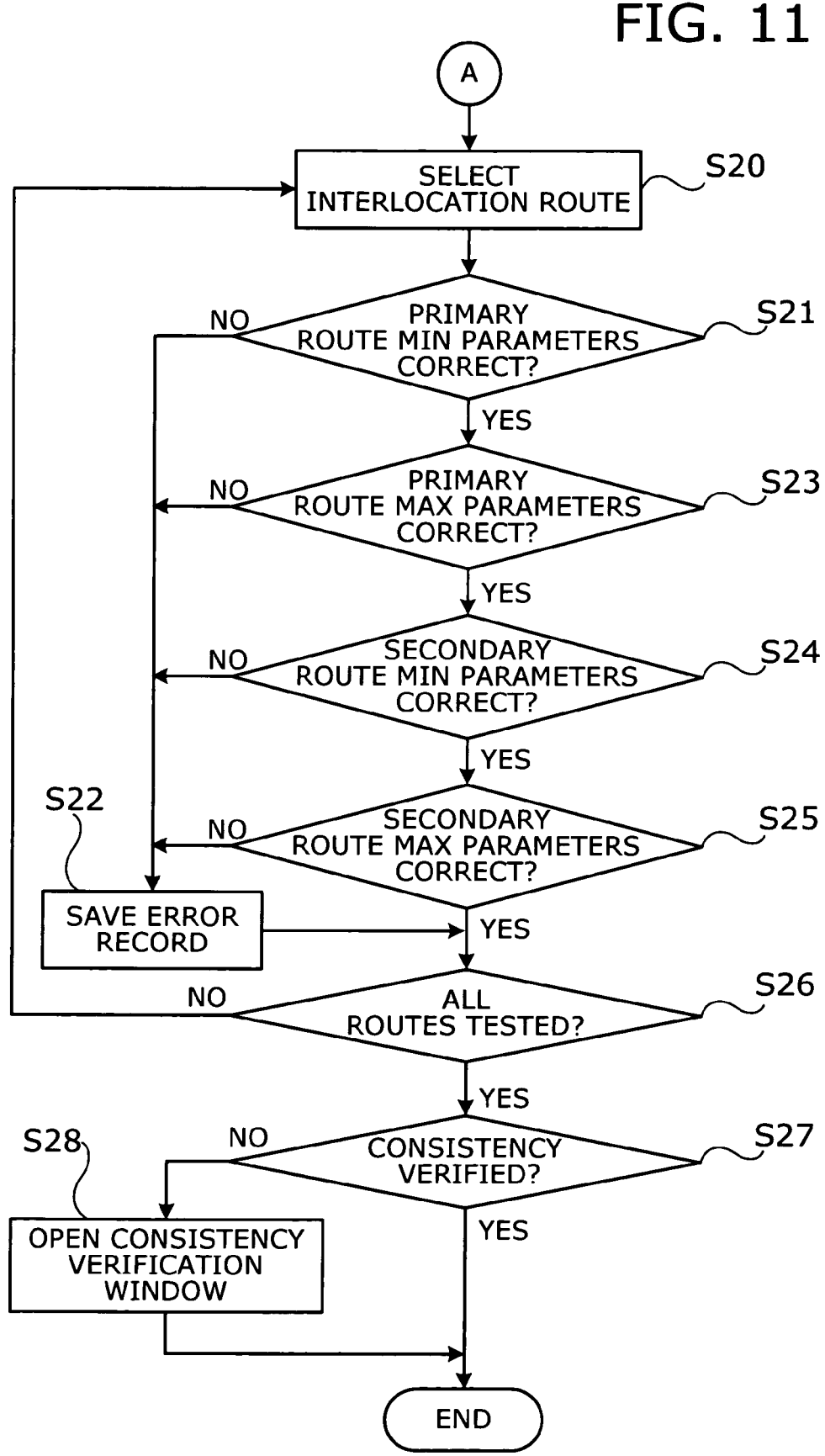

This section describes how the service policy verifier 150 verifies consistency of service policy parameters stored in the service policy table 61a. FIGS. 10 and 11 show a flowchart of a process that verifies consistency of service policy parameters. Briefly, the first half (steps S11 to S19) of this flowchart verifies each specified route, and the second half (steps S20 to 26) verifies bandwidth setting of each route.

The verification process begins with selecting a service from among those listed in the service policy database structure of FIG. 9 (step S11). The service policy verifier 150 then selects one interlocation service from the currently focused service (step S12). The selected interlocation service has a primary forward route, a primary return route, a secondary forward route, and a secondary return route. The service policy verifier 150 traces the reference links of data elements constituting each route, from the start location to the end location, in an attempt to find whether the end location can be reached through the specified interlocation routes (steps S13 to S16). If one or more routes fail to reach the destination (i.e., if either of steps S13 to S16 results in "NO"), the service policy verifier 150 enters a route setting error record to an error log (step S17) and proceeds to steps S18. If all routes are found reachable (i.e., if all steps S13 to S16 result in "YES"), then the service policy verifier 150 determines whether all interlocation services have been checked (step S18). If not (i.e., if "NO" at step S18), the process returns to step S12 to select another interlocation service for verification. If all interlocation services have been checked (i.e., if "YES" at step S18), then the service policy verifier 150 determines whether all services have been checked (step S19). If not ("NO" at step S19), the process returns to step S11 to select another service for verification.

If all services have been checked ("YES" at step S19), the service policy verifier 150 then extracts one set of interlocation routes with a data structure shown in FIG. 9 (step S20). The extracted set of interlocation routes include a primary route and a secondary route. The service policy verifier 150 then checks whether the maximum bandwidth limit and minimum guaranteed bandwidth of each primary route are specified correctly, as well as whether the same of each secondary route are specified correctly. Specifically, the service policy verifier 150 executes the following tests:

The service policy verifier 150 first examines the minimum guaranteed bandwidth of primary routes. More specifically, it sums up the minimum guaranteed bandwidths of all services that use the WAN under verification as their primary route. The result is referred to as a first sum. The service policy verifier 150 determines whether this first sum is lower than the available bandwidth of the WAN under verification multiplied by a guaranteed bandwidth allocation ratio (step S21). This test conditions is referred to as a "first condition." The guaranteed bandwidth allocation ratio is a ratio of bandwidth that can be assigned to bandwidth-guaranteed service traffic. While it has a default value of 0.5, the operator is allowed to specify the ratio as part of environment settings, in the range from zero (exclusive) to one (inclusive).

If the first condition is not satisfied (i.e., if "NO" at step S21), the service policy verifier 150 determines that some minimum guaranteed bandwidths of primary routes are set incorrectly, thus proceeding to step S22. At step S22, the service policy verifier 150 enters a bandwidth setting error record to an error log before it goes to step S26, so as to indicate that there is an error in the current setup of minimum guaranteed bandwidths of services that use the WAN under verification as their primary routes.

If, on the other hand, the first condition is satisfied (i.e., if "YES" at step S21), the service policy verifier 150 advances to the next step in an attempt to determine whether the maximum bandwidth limits are set correctly for primary routes. Specifically, the service policy verifier 150 finds a service that has the largest amount of maximum bandwidth limit among the services using the WAN under verification as their primary routes. Subsequently the service policy verifier 150 subtracts the minimum guaranteed bandwidth of the found service from the maximum bandwidth limit of the same and then adds the result to the first sum, thereby yielding a second sum. The service policy verifier 150 determines whether the second sum is smaller than the available bandwidth of the WAN under verification (step S23). This test condition is referred to as a second condition.

If the second condition is not satisfied (i.e., if "NO" at step S23), the service policy verifier 150 determines that some maximum bandwidth limits of primary routes are set incorrectly, thus proceeding to step S22. At step S22, the service policy verifier 150 enters a bandwidth setting error record to an error log before it goes to step S26, so as to indicate that there is an error in the current setup of maximum bandwidth limit of services that use the WAN under verification as their primary routes.

If, on the other hand, the second condition is satisfied (i.e., if "YES" at step S23), the service policy verifier 150 advances to the next step in an attempt to determine whether the minimum bandwidth limits are set correctly for secondary routes. Specifically, the service policy verifier 150 sums up the minimum guaranteed bandwidths of as many services as specified by a secondary route activation parameter, among those that specify the WAN under verification as their secondary routes. The service policy verifier 150 then adds the result to the second sum, thereby yielding a third sum. The service policy verifier 150 determines whether this third sum is smaller than the available bandwidth of the WAN under verification (step S24). This test condition is referred to as a third condition.

The secondary route activation parameter refers to the number of services that would use the WAN under verification in the event of as many concurrent failures in interlocation routes as specified by a simultaneous route failure parameter, among a plurality of services that specify the WAN under verification as their secondary routes while using some other WANs as their respective primary routes. The simultaneous route failure parameter represents the number of failures that could occur, in the worst case, to WANs other than the one under verification. While its default value is set to one, the operator may give a specific value of the simultaneous route failure parameter as part of the environment settings. If this is the case, the service policy verifier 150 automatically recalculates the secondary route activation parameter from the given value.

If the third condition is not satisfied (i.e., if "NO" at step S24), the service policy verifier 150 determines that some minimum guaranteed bandwidths of secondary routes are set incorrectly, thus proceeding to step S22. At step S22, the service policy verifier 150 enters a bandwidth setting error record to an error log before it goes to step S26, so as to indicate that there is an error in the current setup of minimum guaranteed bandwidth of services that use the WAN under verification as their aux routes.

If, on the other hand, the third condition is satisfied (i.e., if "YES" at step S24), the service policy verifier 150 advances to the next step in an attempt to determine whether the maximum bandwidth limits are set correctly for secondary routes. Specifically, the service policy verifier 150 finds a service that has the largest amount of maximum bandwidth limit, among the services that specify the WAN under verification as their secondary routes. Subsequently the service policy verifier 150 subtracts the minimum guaranteed bandwidth of the found service from the maximum bandwidth limit of the same and then adds the result to the third sum, thereby yielding a fourth sum. The service policy verifier 150 determines whether the fourth sum is smaller than the available bandwidth of the WAN under verification (step S25). This test condition is referred to as a fourth condition.

If the fourth condition is not satisfied (i.e., if "NO" at step S25), the service policy verifier 150 determines that some maximum bandwidth limits of secondary routes are set incorrectly, thus proceeding to step S22. At step S22, the service policy verifier 150 enters a bandwidth setting error record to an error log before it goes to step S26, so as to indicate that there is an error in the current setup of maximum bandwidth limit of services that use the WAN under verification as their aux routes.

If, on the other hand, the fourth condition is satisfied (i.e., if "YES" at step S25), the service policy verifier 150 advances to the next step to determine whether all interlocation routes have been checked. That is, it determines whether all WAN routes are checked (step S26). If there are unchecked interlocation routes (i.e., if "NO" at step S26), then the service policy verifier 150 returns to step S20 to select a new interlocation route for verification. If all interlocation routes have been checked (i.e., if "YES" at step S26), the service policy verifier 150 then determines whether there is any inconsistent route setting or bandwidth setting (step S27). More specifically, it determines whether the error log contains a route setting error record or bandwidth setting error record. If either record is found in the error log (i.e., if "NO" at step S27), the service policy verifier 150 produces a consistency verification window to indicate the inconsistency (step S28) before concluding the present verification session. If the error log has no such records (i.e., if "YES" at step S27), the service policy verifier 150 successfully finishes the verification session.

Consistency Verification Result Window

FIG. 12 shows a window that contains a table representing a consistency verification result. This consistency verification result window 70 has a table field 71 to show a consistency verification result table 71a created to indicate verification results of the service policy table 61a. The consistency verification result table 71a has the following data fields, from left to right: "Service Name," "Type," "Reachability," "Start Location," "Bandwidth Consistency 1," "Exchange Point," "Bandwidth Consistency 2," and "End Location." Each row of the consistency verification result table 71a forms an associated set of parameters describing a consistency verification result. Some data fields are common to the service policy table 61a described in an earlier section. The following will focus on the data fields that are not present in the service policy table 61a.

The reachability fields contains a value of "GOOD" or "NOT GOOD" to indicate the results of consistency verification steps S11 to S19 for each verified primary forward route, primary return route, secondary forward route, and secondary return route. The example of FIG. 12 suggests that there is an error in the current setup of a secondary return route.

The bandwidth consistency 1 field indicates the result of bandwidth verification steps S20 to S26 for each verified WAN (i.e., each verified primary forward route, primary return route, secondary forward route, and secondary return route) between a start location and an exchange point. The field contains a value of "GOOD" for bandwidth parameters with no error. In the case of an error, the field indicates the name of the erroneous bandwidth parameter. The example of FIG. 12 shows an error indication suggesting that the primary return route on the WAN 22 between the data center 21 and exchange point 24 has a problem with the minimum bandwidth settings of some related secondary routes. The example of FIG. 12 also shows another error indication suggesting that the secondary forward route on the WAN 28 between the sales branch 30 and exchange point 25 has a problem with minimum bandwidth settings of some related primary routes.

The bandwidth consistency 2 field indicates the result of bandwidth verification steps S20 to S26 for each verified WAN (i.e., each verified primary forward route, primary return route, secondary forward route, and secondary return route) between an exchange point and an end point. The field contains a value of "GOOD" for bandwidth parameters with no error. When an error exists, the field indicates the name of the erroneous bandwidth parameter. The example of FIG. 12 shows an error indication suggesting that the primary return route on the WAN 28 between the exchange point 24 and sales branch 30 has a problem with maximum bandwidth limit settings of some related secondary routes. FIG. 12 also shows another error indication pointing out that the secondary forward route on the WAN 23 between the exchange point 25 and data center 21 has a problem with maximum bandwidth limit settings of some related primary routes. Such error indications in the consistency verification result table 71a will help the operator to correct erroneous parameters in the service policy table 61a of FIG. 8.

Command Generation

FIG. 13 gives a command reference table showing how the setting commands for edge devices vary depending on vendors. The command generator 160 uses this table to produce commands suitable for each target edge device. Specifically, a model-1 command class 98, model-2 command class 99, and model-3 command class 72 are produced from the interlocation service class 88 and service bandwidth policy class 89. Appropriate commands can be produced in this way for each of the primary forward route, primary return route, secondary forward route, and secondary return route of an interlocation service.

Figure 14:
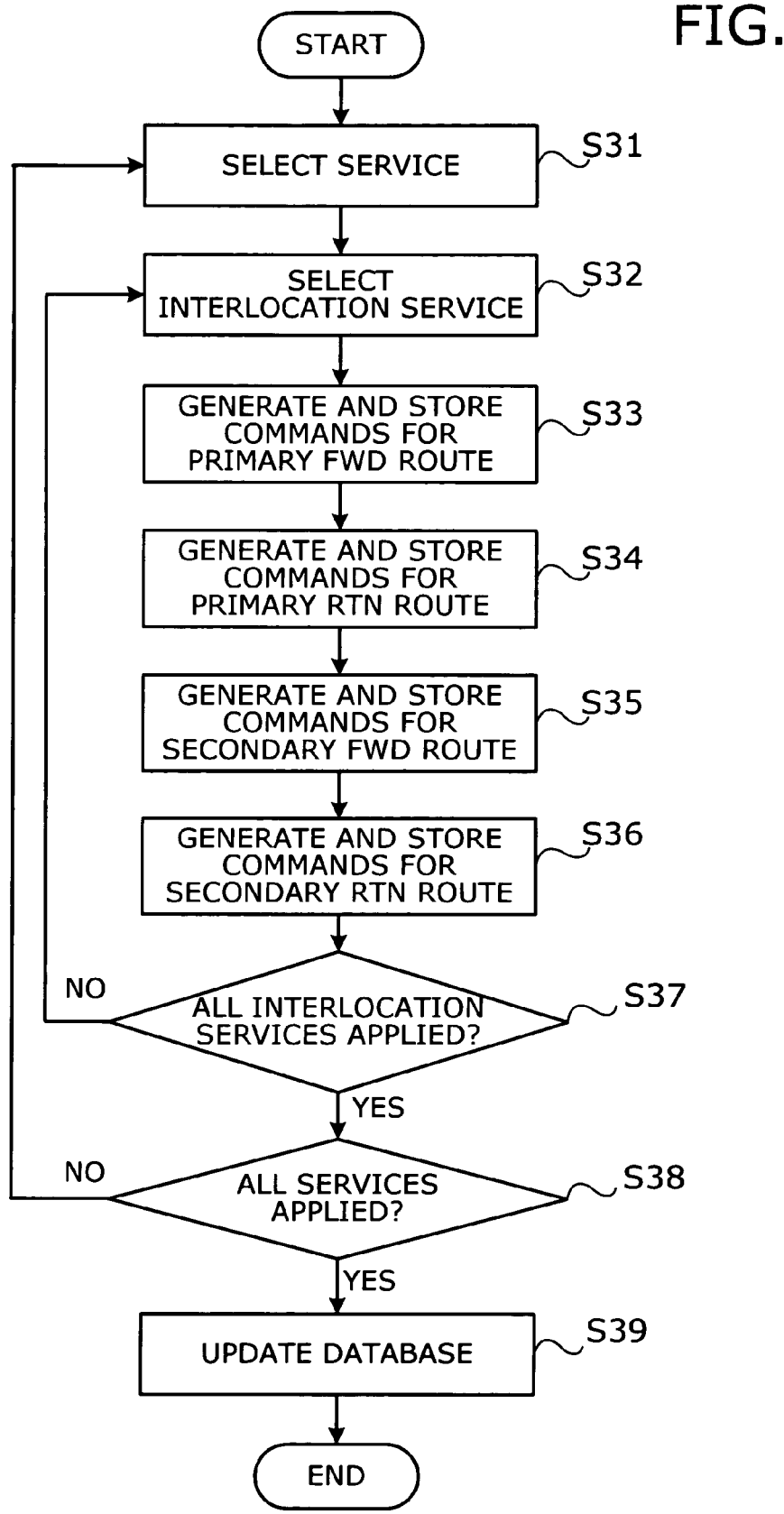
FIG. 14 is a flowchart of a command generation process.

FIG. 14 is a flowchart showing how the command generator 160 produces a command. Specifically, the command generator 160 first refers to a list of services of the service class 87 (step S31) according to its data structure shown in FIG. 9. The command generator 160 then extracts an interlocation service included in one of the services (step S32). The command generator 160 generates a command for each of the primary forward route, primary return route, secondary forward route, and secondary return route of the extracted interlocation service (step S33 to S36).

The command generator 160 then determines whether it has produced commands for all interlocation services (step S37). If not (i.e., if "NO" at step S37), the command generator 160 returns to step S32 to extract another interlocation service for further command generation. If commands have been produced for all interlocation services (if "YES" at step S37), the command generator 160 determines whether it has produced commands for all services (step S38). If not (i.e., if "NO" at step S38), the command generator 160 returns to step S31 to focus on another service for further command generation. If commands have been produced for all services (i.e., if "YES" at step S38), the command generator 160 transfers the produced commands to the command classes referenced by an edge device class according to the data structure of FIG. 9 (step S39), thus concluding the present command generation process.

Reconfiguration of Edge Devices

Figure 15:
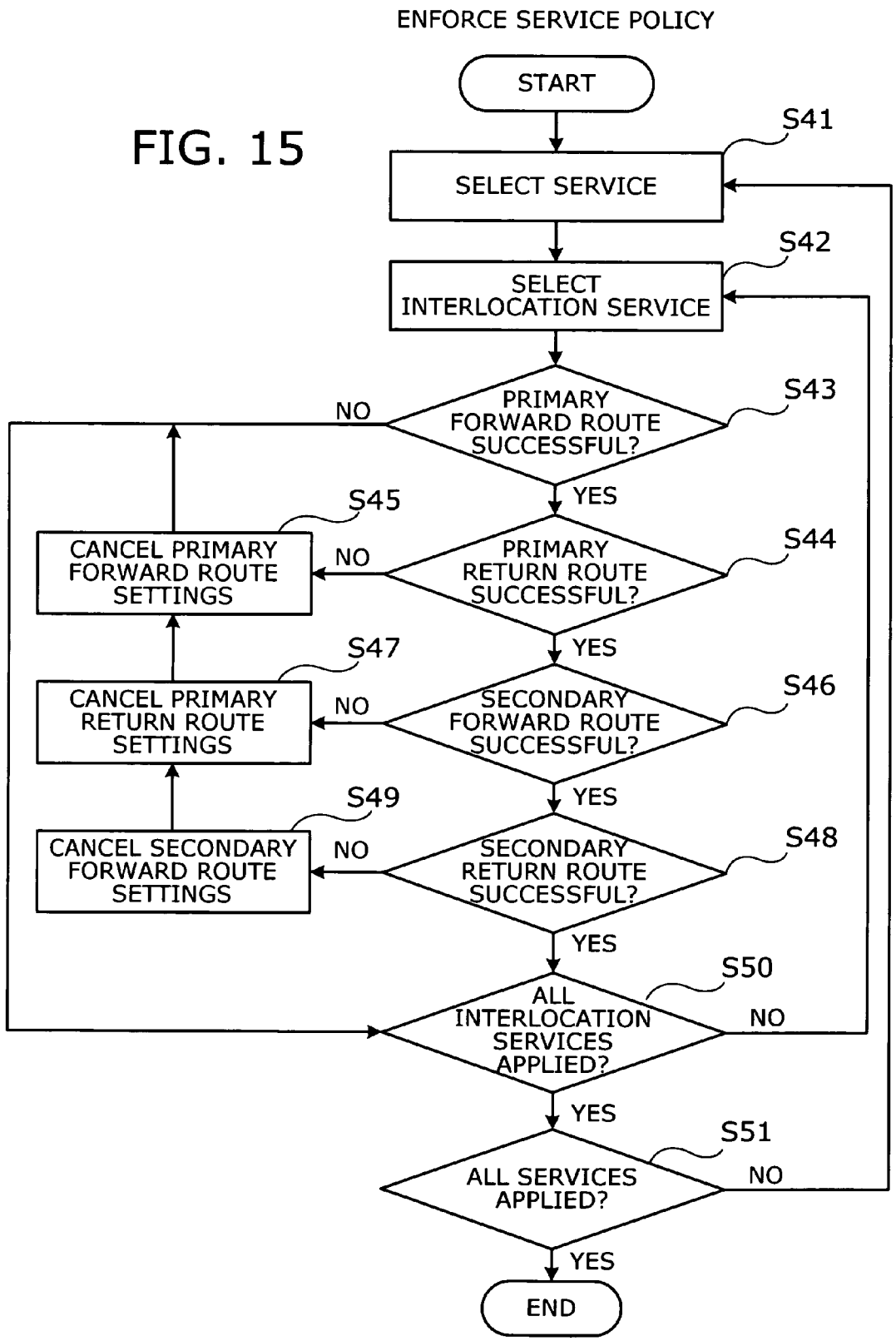
FIG. 15 is a flowchart of a process of reconfiguring edge devices.

FIG. 15 is a flowchart showing how the service policy enforcer 170 reconfigures edge devices. Specifically, the service policy enforcer 170 first refers to a list of services of the service class 87 (step S41) according to its data structure shown in FIG. 9. The service policy enforcer 170 then extracts an interlocation service included in one of the services (step S42). The extracted interlocation service involves a primary forward route, primary return route, secondary forward route, and secondary return route. The service policy enforcer 170 configures edge devices with those routes as a single transaction. If it fails to setup any of those routes, the service policy enforcer 170 cancels the settings about all the routes including those that have been successfully configured. The following will describe the process in greater detail.

The service policy enforcer 170 begins with determining whether the edge devices have successfully been configured for the primary forward route (step S43). If not successful (i.e., if "NO" at step S43), the service policy enforcer 170 moves to step S50. If successful (i.e., if "YES" at step S43), the service policy enforcer 170 then determines whether the edge devices have successfully been configured for the primary return route (step S44). If not successful (i.e., if "NO" at step S44), the service policy enforcer 170 cancel the changes made to edge devices on the primary forward route (step S45) and proceeds to step S50. If successful (i.e., if "YES" at step S44), the service policy enforcer 170 then determines whether the edge devices have successfully been configured for the secondary forward route (step S46). If not successful (i.e., if "NO" at step S46), the service policy enforcer 170 cancel the changes made to edge devices on the primary forward route and primary return route (steps S45 and S47) and proceeds to step S50. If successful (i.e., if "YES" at step S46), the service policy enforcer 170 then determines whether the edge devices have successfully been configured for the secondary return route (step S48). If not successful (i.e., if "NO" at step S48), the service policy enforcer 170 cancel the changes made to edge devices on the primary forward route, primary return route, and secondary forward route (steps S45, S47, and S49) and proceeds to step S50. If successful (i.e., if "YES" at step S48), the service policy enforcer 170 then determines whether all interlocation services have been applied (step S50).

If there are unapplied interlocation services (i.e., if "NO" at step S50), the service policy enforcer 170 returns to step S42 to select a new interlocation service for further policy enforcement. If all interlocation services have been applied (i.e., if "YES" at step S50), the service policy enforcer 170 determines whether all services have been applied (step S51). If not (i.e., if "NO" at step S51), the service policy enforcer 170 returns to step S41 to select a new service for further policy enforcement. The process completes when all services are applied (i.e., if "YES" at step S51).

Advantages

The above sections have described a network system 300 according to the present embodiment. As can be seen, the service policy verifier 150 verifies settings of primary and secondary routes on a specific WAN by finding services that use that WAN as their primary routes or secondary routes and determining whether the sum of their guaranteed bandwidths is smaller than the WAN's available bandwidth, based on an edge device data table 41a, WAN configuration table 51a, and service policy table 61a. The service policy verifier 150 verifies every WAN in this way, thus helping the network operator to determine whether each service is configured correctly in terms not only of bandwidth settings, but also of route settings.

The service policy verifier 150 is also designed to calculate first to fourth sums in a stepwise manner to verify the minimum guaranteed bandwidth and maximum bandwidth limit of primary routes and secondary routes individually. The results of this calculation are summarized in a consistency verification result table 71a for the purpose of browsing by the operator. This feature helps him/her to identify and locate an error in the route setup and/or bandwidth setup, as well as to reconfigure the system with correct route and bandwidth parameters.

The present embodiment allows the operator to set a simultaneous route failure parameter, which enables him/her to determine whether each service can deliver an expected level of quality even if two or more interlocation routes are failed at the same time.

The present embodiment provides an edge device data table 41a to collect information about edge devices, which enables the management server 100 to configure a wide variety of edge devices without much knowledge about their quality of service (QoS). Also the command generator 160 is designed to produce device-specific commands automatically, without requiring the operator to prepare a configuration file. The produced commands are applied to each edge device by the service policy enforcer 170, thus eliminating the need for the operator to log in to an edge device using Telnet or other facilities.

While the above-described embodiment has a two layers of networks, the present invention is not limited to this specific type of network system. The system may have more layers. Or alternatively, the system may be configured in a star topology, which is a form of a singly-layer network.

Also, while the above-described embodiment includes only one management WAN, the present invention is not limited to that configuration. It is possible to employ two or more management servers 100. It is also possible to place the management server 100 in the data center 21.

Computer Programs

The functions of the above-described management server 100 are implemented as a computer application. That is, the present invention can be realized by running computer programs designed for the purpose. The programs includes a series of instructions describing what the management server 100 is supposed to do. A computer system executes such programs to provide the intended functions of the present invention. For the purpose of storage and distribution, the programs may be stored in a computer-readable storage medium. Suitable computer-readable storage media include magnetic storage media, optical discs, magneto-optical storage media, and solid state memory devices. Magnetic storage media include hard disk drives (HDD), flexible disks (FD), and magnetic tapes. Optical discs include digital versatile discs (DVD), DVD-RAM, compact disc read-only memory (CD-ROM), CD-Recordable (CD-R), and CD-Rewritable (CD-RW). Magneto-optical storage media include magneto-optical discs (MO).

Portable storage media, such as DVD and CD-ROM, are suitable for distribution of program products. Network-based distribution of software programs is also possible, in which case several master program files are made available on a server computer for downloading to other computers via a network. A user computer stores necessary software components in its local storage unit, which have previously been installed from a portable storage media or downloaded from a server computer. The computer executes the programs read out of the local storage unit, thereby performing the programmed functions. As an alternative way of program execution, the computer may execute programs, reading out program codes directly from a portable storage medium. Another alternative method is that the user computer dynamically downloads programs from a server computer when they are demanded and executes them upon delivery.

CONCLUSION

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A method, executed by a computer, of configuring networks to maintain quality of services executed between an access source location and an access destination location, the method comprising:

receiving, by the computer, input data describing a plurality of services each having a first route and a second route between the access source location and the access destination location, an available bandwidth of each network carrying traffic of the services, and a secured bandwidth of each of the services;

selecting, by the computer, a first network to be verified from among the plurality of networks, based on the received input data;

extracting, by the computer, first services that use the first network as first routes thereof;

selecting, by the computer, at least one second network from among the networks that the first services specify as second routes thereof;

extracting, by the computer, second services that use the second network as first routes thereof and specify the first network as second routes thereof;

calculating, by the computer, a sum of the secured bandwidths that are supposed to be available to the first services and the second services;

determining, by the computer, whether the sum is smaller than an available bandwidth of the first network;

calculating, by the computer, a first sum of minimum secured bandwidths of the first services;

storing in a memory of the computer a secured bandwidth allocation ratio which specifies how much of the available bandwidth the first services are allowed to occupy;

first determining, by the computer, whether the first sum is smaller than a bandwidth obtained by multiplying the available bandwidth of the first network by the secured bandwidth allocation ratio;

outputting a result of the first determination;

identifying, by the computer, one of the first services that has the largest amount of maximum bandwidth limit;

calculating, by the computer, a second sum by adding to the first sum a difference between the maximum bandwidth limit of the identified first service and the minimum secured bandwidth of the identified first service;

second determining, by the computer, whether the second sum is smaller than the available bandwidth of the first network;

outputting a result of the second determination;

calculating, by the computer, a third sum by adding to the second sum a sum of the minimum secured bandwidths of a predetermined number of services that specify the first network as second routes thereof;

third determining, by the computer, whether the third sum is smaller than the available bandwidth of the first network;

outputting a result of the third determination;

finding, by the computer, a service that has a largest amount of maximum bandwidth limit, among the services that specify the first network as second routes thereof;

calculating, by the computer, a fourth sum by adding to the third sum a difference between the maximum bandwidth and minimum bandwidth of the found service;

fourth determining, by the computer, whether the fourth sum is smaller than the available bandwidth of the first network and outputting a result of the fourth determination.

2. The method according to claim 1, wherein the predetermined number represents how many of the second services would switch to the second routes thereof if the second network failed.

3. The method according to claim 1, further comprising recording, by the computer, results of each of the determining operations that compare the first to fourth sums with the available bandwidth of the first network.

4. The method according to claim 1, wherein all the networks are sequentially selected as the first network for subsequent verification.

5. The method according to claim 1, wherein the first and second routes never meet each other until reaching the access destination location.

6. An apparatus for configuring networks to maintain quality of services executed between an access source location and an access destination location, the apparatus comprising:

at least one processing device with a memory that executes:

receiving input data describing a plurality of services each having a first route and a second route between the access source location and the access destination location, an available bandwidth of each network carrying traffic of the services, and a secured bandwidth of each of the services, selecting from among the plurality of networks a first network to be verified, based on the received input data, extracting first services that use the first network as first routes thereof, selecting at least one second network from among the networks that the first services specify as second routes thereof, and extracting second services that use the second network as first routes thereof and specify the first network as second routes thereof;

calculating a sum of the secured bandwidths that are supposed to be available to the first services and the second services, and determining whether the sum is smaller than an available bandwidth of the first network;

storing in the memory of the processing device a secured bandwidth allocation ratio which specifies how much of the available bandwidth the first services are allowed to occupy;

calculating a first sum of minimum secured bandwidths of the first services, and first determining whether the first sum is smaller than a bandwidth obtained by multiplying the available bandwidth of the first network by the secured bandwidth allocation ratio;

outputting a result of the first determination;

identifying one of the first services that has the largest amount of maximum bandwidth limit;

calculating a second sum by adding to the first sum a difference between the maximum bandwidth limit of the identified first service and the minimum secured bandwidth of the identified first service;

second determining whether the second sum is smaller than the available bandwidth of the first network;

outputting a result of the second determination;

calculating a third sum by adding to the second sum a sum of the minimum secured bandwidths of a predetermined number of services that specify the first network as second routes thereof;

third determining whether the third sum is smaller than the available bandwidth of the first network;

outputting a result of the third determination;

finding a service that has a largest amount of maximum bandwidth limit, among the services that specify the first network as second routes thereof;

calculating a fourth sum by adding to the third sum a difference between the maximum bandwidth and minimum bandwidth of the found service;

fourth determining whether the fourth sum is smaller than the available bandwidth of the first network; and outputting a result of the fourth determination.

7. The apparatus according to claim 6, wherein the predetermined number represents how many of the second services would switch to the second routes thereof if the second network failed.

8. The apparatus according to claim 6, further comprising means for recording results of said determining as to each of the first to fourth sums in comparison with the available bandwidth of the first network.

9. The apparatus according to claim 6, wherein the extracting means sequentially selects all the networks as the first network for subsequent verification by the verifying means.

10. The apparatus according to claim 6, wherein the first and second routes never meet each other until reaching the access destination location.

11. A computer-readable, non-transitory medium storing a program for configuring networks to maintain quality of services executed between an access source location and an access destination location, the program causing a computer to execute a procedure, the procedure comprising:

receiving input data describing a plurality of services each having a first route and a second route between the access source location and the access destination location, an available bandwidth of each network carrying traffic of the services, and a secured bandwidth of each of the services, selecting from among the plurality of networks a first network to be verified, based on the received input data, extracting first services that use the first network as first routes thereof, selecting at least one second network from among the networks that the first services specify as second routes thereof, and extracting second services that use the second network as first routes thereof and specify the first network as second routes thereof;

calculating a sum of the secured bandwidths that are supposed to be available to the first services and the second services, and first determining whether the sum is smaller than an available bandwidth of the first network;

storing a secured bandwidth allocation ratio which specifies how much of the available bandwidth the first services are allowed to occupy;

calculating a first sum of minimum secured bandwidths of the first services, and first determining whether the first sum is smaller than a bandwidth obtained by multiplying the available bandwidth of the first network by the secured bandwidth allocation ratio;

outputting a result of the first determination;

identifying one of the first services that has the largest amount of maximum bandwidth limit;

calculating a second sum by adding to the first sum a difference between the maximum bandwidth limit of the identified first service and the minimum secured bandwidth of the identified first service;

second determining whether the second sum is smaller than the available bandwidth of the first network;

outputting a result of the second determination;

calculating a third sum by adding to the second sum a sum of the minimum secured bandwidths of a predetermined number of services that specify the first network as second routes thereof;

third determining whether the third sum is smaller than the available bandwidth of the first network;

outputting a result of the third determination;

finding a service that has a largest amount of maximum bandwidth limit, among the services that specify the first network as second routes thereof;

calculating a fourth sum by adding to the third sum a difference between the maximum bandwidth and minimum bandwidth of the found service;

fourth determining whether the fourth sum is smaller than the available bandwidth of the first network; and outputting a result of the fourth determination.

* * * * *